US011436408B2

(12) United States Patent
Pailla et al.

(10) Patent No.: US 11,436,408 B2
(45) Date of Patent: Sep. 6, 2022

(54) TARGETED NATURAL LANGUAGE RESPONSES FOR ELECTRONIC COMMUNICATIONS

(71) Applicant: Motorola Mobility LLC, Chicago, IL (US)

(72) Inventors: Panduranga Reddy Pailla, Bangalore (IN); Vijayprakash Bheemsainrao Idlur, Bangalore (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/918,514

(22) Filed: Jul. 1, 2020

(65) Prior Publication Data

US 2022/0004707 A1   Jan. 6, 2022

(51) Int. Cl.
*G06F 17/10* (2006.01)
*G06F 40/20* (2020.01)
(Continued)

(52) U.S. Cl.
CPC ............ *G06F 40/20* (2020.01); *G06F 3/0482* (2013.01); *G06N 20/00* (2019.01); *H04L 51/046* (2013.01)

(58) Field of Classification Search
CPC ....... G06F 40/20; G06F 3/0482; G06N 20/00; H04L 51/046
See application file for complete search history.

(56) References Cited

U.S. PATENT DOCUMENTS 5,850,219 A * 12/1998 Kumomura .......... G06Q 10/107
709/206
7,814,155 B2 * 10/2010 Buchheit ................. H04L 51/16
709/206

(Continued)

FOREIGN PATENT DOCUMENTS

EP   3291101 A1 *   3/2018   ............. G06F 17/24

OTHER PUBLICATIONS

Kannan, Anjuli, et al. "Smart reply: Automated response suggestion for email." Proceedings of the 22nd ACM SIGKDD International Conference on Knowledge Discovery and Data Mining. (Year: 2016).*

(Continued)

*Primary Examiner* — Shahid K Khan
(74) *Attorney, Agent, or Firm* — FIG. 1 Patents

(57) ABSTRACT

A device receives an electronic communication from another device, such as an email. The communication is addressed to multiple recipients and the device determines an association of content in the communication to a user of the device. This association of content to a user can be determined in various manners, such as by identifying one of multiple portions of the communication that is directed to the user rather than other recipients of the communication, determining whether the user is a primary recipient or a secondary recipient of the communication, and so forth. The device generates a set of natural language responses to the communication for the user based at least in part on this association. The device displays the set of natural language responses and receives user selection of one of the natural language responses, then sends the selected natural language response to at least the other device.

20 Claims, 7 Drawing Sheets

(51) Int. Cl.
*G06N 20/00* (2019.01)
*H04L 51/046* (2022.01)
*G06F 3/0482* (2013.01)

(56) References Cited

U.S. PATENT DOCUMENTS

| | | | | |
|---|---|---|---|---|
| 8,103,726 B2* | 1/2012 | Stoddard | | G06Q 10/107 |
| | | | | 709/206 |
| 8,621,022 B2* | 12/2013 | Buchheit | | G06Q 10/10 |
| | | | | 709/206 |
| 9,154,514 B1* | 10/2015 | Prakash | | G06F 21/561 |
| 9,904,673 B2* | 2/2018 | Janakiraman | | H04L 51/063 |
| 10,250,541 B2* | 4/2019 | Beach | | H04L 51/02 |
| 10,387,461 B2* | 8/2019 | Sharifi | | G06Q 10/107 |
| 10,447,641 B2* | 10/2019 | Agrawal | | H04L 51/02 |
| 10,530,723 B2* | 1/2020 | Milligan | | H04L 67/20 |
| 10,757,043 B2* | 8/2020 | Gershony | | H04L 51/20 |
| 2003/0033167 A1* | 2/2003 | Arroyo | | G06Q 10/103 |
| | | | | 705/7.42 |
| 2005/0014122 A1* | 1/2005 | Ruvinsky | | G09B 7/02 |
| | | | | 434/350 |
| 2005/0222985 A1* | 10/2005 | Buchheit | | H04L 51/22 |
| 2008/0195953 A1* | 8/2008 | Sen | | G06Q 10/107 |
| | | | | 715/744 |
| 2013/0007648 A1* | 1/2013 | Gamon | | G06Q 10/109 |
| | | | | 715/771 |
| 2013/0013718 A1* | 1/2013 | Buchheit | | G06Q 10/10 |
| | | | | 709/206 |
| 2013/0097260 A1* | 4/2013 | Lee | | H04W 4/00 |
| | | | | 709/206 |
| 2013/0290435 A1* | 10/2013 | Martin | | G06Q 10/107 |
| | | | | 709/206 |
| 2015/0143255 A1* | 5/2015 | Agrawal | | H04L 51/28 |
| | | | | 715/752 |
| 2016/0330144 A1* | 11/2016 | Dymetman | | G06F 16/48 |
| 2017/0180276 A1* | 6/2017 | Gershony | | H04L 51/20 |
| 2017/0180294 A1* | 6/2017 | Milligan | | H04L 51/02 |
| 2017/0200093 A1* | 7/2017 | Motahari Nezhad | | |
| | | | | G06Q 10/1095 |
| 2018/0052909 A1* | 2/2018 | Sharifi | | G06F 16/3326 |
| 2018/0121034 A1* | 5/2018 | Baker | | G06Q 50/01 |
| 2018/0124000 A1* | 5/2018 | Bernstein | | H04L 51/02 |
| 2018/0367655 A1* | 12/2018 | Yoon | | H04M 1/2746 |
| 2019/0097955 A1* | 3/2019 | Patil | | G06F 40/274 |
| 2020/0210463 A1* | 7/2020 | Gujarathi | | G06F 16/335 |

OTHER PUBLICATIONS

"Smart Reply", Retrieved at: https://firebase.google.com/docs/ml-kit/generate-smart-replies—on May 6, 2020, 3 pages.

Henderson, Matthew et al., "Efficient Natural Language Response Suggestion for Smart Reply", May 1, 2017, 15 pages.

* cited by examiner

TARGETED NATURAL LANGUAGE RESPONSES FOR ELECTRONIC COMMUNICATIONS

BACKGROUND

As technology has advanced our uses for computing devices have expanded. One such use is sending to and receiving from users of other devices text, image, and audio messages. Various messaging applications can be used allowing users to respond to send and receive messages. However, these messaging applications are not without their problems. One such problem is that it can be time consuming for users to enter their desired response or users may be in a situation where it is difficult for them to enter their desired response, such as riding in a bouncing car or public transportation. These problems can be frustrating for users, leading to user frustration with their devices and messaging applications.

BRIEF DESCRIPTION OF THE DRAWINGS

Embodiments of targeted natural language responses for electronic communications are described with reference to the following drawings. The same numbers are used throughout the drawings to reference like features and components.

DETAILED DESCRIPTION

Figure 1:
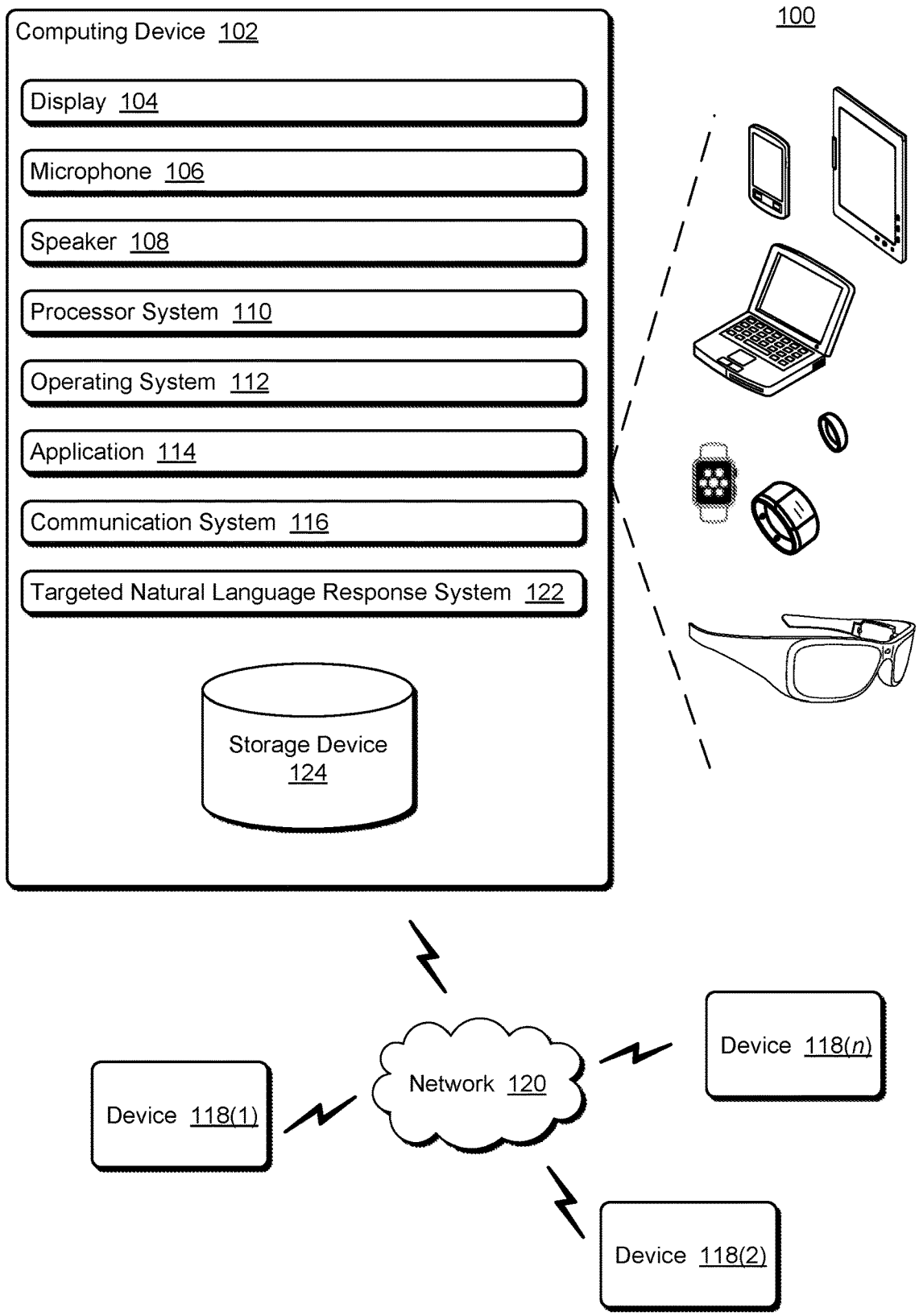
FIG. 1 illustrates an example system including a computing device implementing the techniques discussed herein.

Targeted natural language responses for electronic communications is discussed herein. Generally, a computing device receives an electronic communication from another device, such as an email, a Short Message Service (SMS), a Multimedia Messaging Service (MMS) message, or a group based chat messaging system. The electronic communication is addressed to multiple recipients and the receiving computing device determines an association of content in the electronic communication to a user of the device. This association of content to a user can be determined in various manners, such as by identifying one of multiple portions of the electronic communication that is directed to the user rather than other recipients of the electronic communication, determining whether the user is a primary recipient or a secondary recipient of the electronic communication, and so forth.

The computing device generates a set of natural language responses to the electronic communication for the user based at least in part on this association. The computing device displays the set of natural language responses and receives user selection of one of the natural language responses, then sends the selected natural language response to another device, such as the device from which the electronic communication was sent (and optionally to the devices of all other recipients of the electronic communication).

In contrast to traditional messaging applications or other electronic communication applications, the techniques discussed herein generate a set of natural language responses to an electronic communication based on the association of the content to the user. Different users can be associated with different content in the electronic communication. For example, one user may be a primary recipient of the electronic communication (e.g., included in a "to" field of an email) while another user may be a secondary recipient of the electronic communication (e.g., included in the "cc" field of an email). Using the techniques discussed herein, computing devices receiving the electronic communication can generate different sets of natural language responses for different users that are associated with different content in the electronic communication. Continuing with the previous example, assume user A sends an electronic communication wishing user B a happy birthday and copying user C. User B's device can generate a natural language response to the electronic communication of "Thank you!" whereas user C's device can generate a natural language response to the electronic communication of "Yes, Happy Birthday!".

The techniques discussed herein improve the operation of a computing device by allowing the computing device to generate a user interface including natural language responses to an electronic communication that are based on the association of the device user with the content in the electronic communication. This simplifies the process of the user responding to the electronic communication because the natural language responses are targeted to the user because of his or her association with the content in the electronic communication and are more appropriate for the user than generic natural language responses generated for all recipients of the electronic communication.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores and/or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes a communication system 116. The communication system 116 manages communication with various other devices, including establishing voice calls with other devices 118(1), . . . , 118(n), sending electronic communications to and receiving electronic communications from other devices, and so forth. The content of these electronic communications and the recipients of these electronic communications is managed by an application 114 or the operating system 112. This management of the content and recipients can include displaying received electronic communications, providing a user interface to compose a new electronic communication or reply to a received electronic communication, select recipients for an electronic communication, display natural language responses, and so forth.

The devices 118 can be any of a variety of types of devices, analogous to the discussion above regarding the computing device 102. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, email, group based chat messaging system, and so forth. This communication can be carried out over a network 120, which can be any of a variety of different networks, including the Internet, a local area network (LAN), a public telephone network, a cellular network, an intranet, other public and/or proprietary networks, combinations thereof, and so forth.

The computing device 102 also includes a targeted natural language response system 122. The targeted natural language response system 122 analyzes electronic communications received from other devices 118 and determines, for a received electronic communication, an association of content in the electronic communication to a user of the computing device 102. The targeted natural language response system 122 generates a set of natural language responses to the electronic communication for the user based at least in part on this association and provides the set of natural language responses to an application 114 or the operating system 112 managing electronic communications. This application 114 or the operating system 112 receives user selection of a natural language response in the set of natural language responses and sends, via the communication system 116, the selected natural language response to at least the sending device from which the electronic communication was received and optionally to the devices of all other recipients of the electronic communication.

The targeted natural language response system 122 can be implemented in a variety of different manners. For example, the targeted natural language response system 122 can be implemented as multiple instructions stored on computer-readable storage media and that can be executed by the processor system 110. Additionally or alternatively, the targeted natural language response system 122 can be implemented at least in part in hardware (e.g., as an application-specific integrated circuit (ASIC), a field-programmable gate array (FPGA), and so forth).

The computing device 102 also includes a storage device 124. The storage device 124 can be implemented using any of a variety of storage technologies, such as magnetic disk, optical disc, Flash or other solid state memory, and so forth. The storage device 124 can store various program instructions and data for any one or more of the operating system 112, application 114, and the targeted natural language response system 122.

Figure 2:
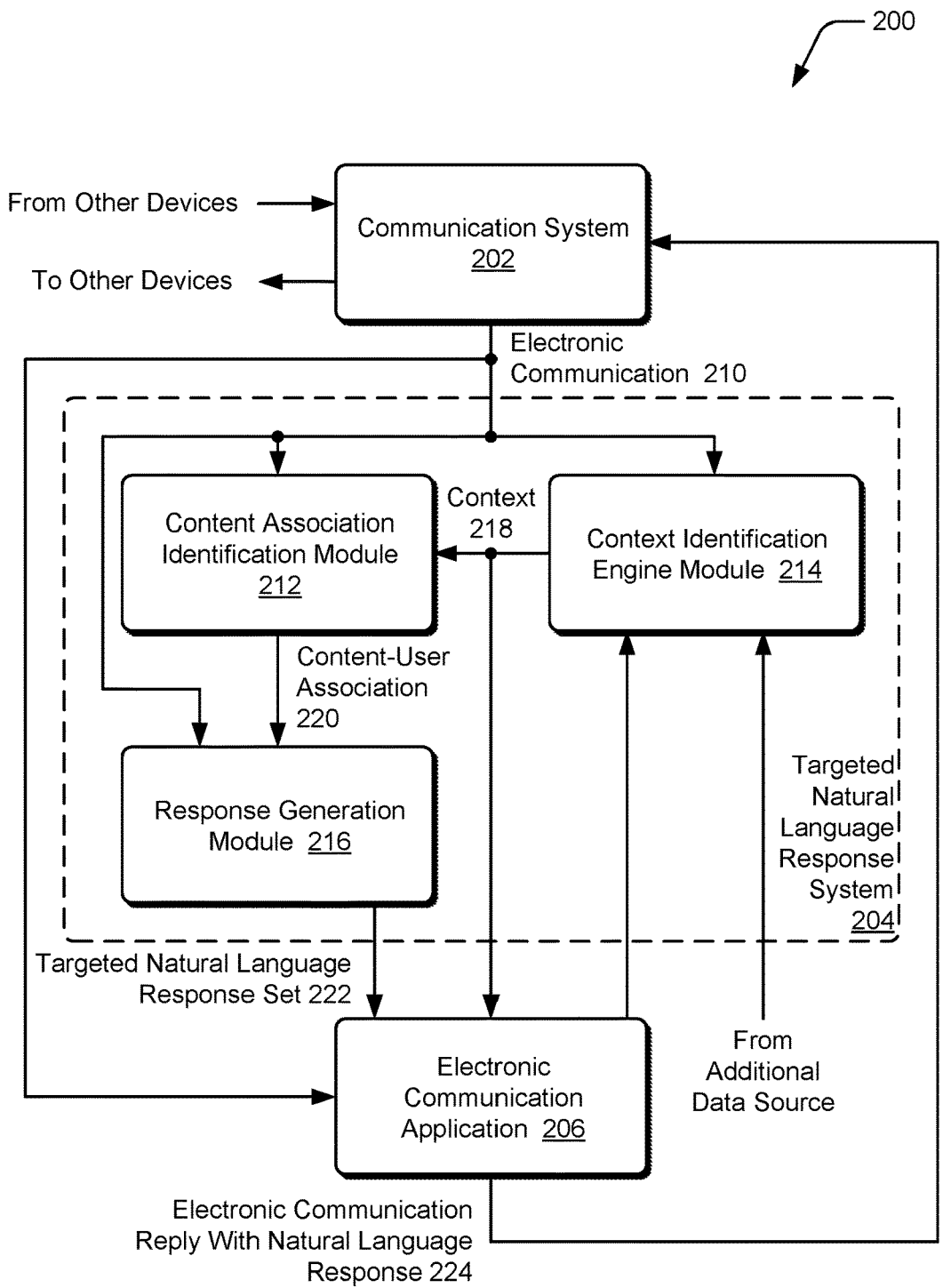
FIG. 2 illustrates an example system implementing the techniques discussed herein.

FIG. 2 illustrates an example system 200 implementing the techniques discussed herein. The system 200 includes a communication system 202, a targeted natural language response system 204, and an electronic communication application 206. By way of example, the communication system 202 can be the communication system 116 of FIG. 1, the targeted natural language response system 204 can be the targeted natural language response system 122 of FIG. 1, and the electronic communication application 206 can be an application 114 of FIG. 1.

The communication system 202 receives an electronic communication 210 from another device, such as a device 118 of FIG. 1, and provides the electronic communication 210 to the targeted natural language response system 204. Additionally or alternatively, the communication system 202 can provide the electronic communication 210 to the electronic communication application 206, which in turn provides the electronic communication 210 to the targeted natural language response system 204. The targeted natural language response system 204 includes a content association identification module 212, a context identification engine module 214, and a response generation module 216.

The electronic communication 210 can take any of a variety of different forms. For example, the electronic communication 210 can be an email, an SMS message, an MMS message, other public or proprietary messaging formats, and so forth.

The electronic communication 210 has content that can include a body portion, a subject line, a timestamp, one or more recipients, and so forth. The recipients can be identified explicitly or implicitly. For example, the electronic communication 210 may include a recipients list, such as in TO and CC fields of an email. By way of another example, the electronic communication 210 may include a group identifier that electronic communication application 206 knows corresponds to a list of recipients. In such situations, the electronic communication application 206 provides the list of recipients to communication system 202 or context identification engine module 214.

The context identification engine module 214 collects various information regarding the electronic communication 210, referred to as the context or the context of the electronic communication 210. The context refers to information related to the electronic communication 210, such as recipients of the electronic communication 210, information regarding the recipients of the electronic communication 210, metadata for the electronic communication, information describing the environment that the receiving device is in, and so forth. The context can take various forms and is collected over time from various sources internal to or external to the device implementing the system 200. These data sources can be, for example, databases (e.g., containing data regarding employees of an organization, such as hire dates, positions or titles, office locations), address books (e.g., containing data regarding contacts or acquaintances of the user, such as birthdays, anniversaries, preferred restaurants or foods), electronic communication application 206 or other electronic communication applications (e.g., providing received electronic communications, sent electronic communications, electronic communication threads), the electronic communication 210 itself (e.g., indicating gender of a recipient, familial relationships of recipients), and so forth.

Any of a variety of public or proprietary techniques can be used to collect this information. For example, the context identification engine module 214 can be implemented using any of a variety of algorithms employing various rules or criteria, a machine learning system, and so forth. The context identification engine module 214 provides this collected information regarding the recipients of the electronic communication 210 as context 218. For example, the context identification engine module 214 may include rules to include in the context 218, for each recipient in the electronic communication 210, hire dates, birthday dates, previous electronic communications with the recipient, and so forth.

The content association identification module 212 receives the electronic communication 210 from the communication system 202 and the context 218 from the context identification engine module 214, and determines the association of content in the electronic communication 210 to the user of the system 200 based on the electronic communication 210 and the context 218. The user of the system 200 refers to a user that is identified as a current user of the electronic communication application 206 or the device implementing the system 200. For example, the user of the system 200 can be a user that is logged into the electronic communication application 206 or logged into the device that implements the system 200. The user of the system 200 is also referred to as a recipient of the electronic communication 210.

The association of content in the electronic communication 210 to a user refers to a relationship between the content and the user. For example, the association of content in the electronic communication 210 to a user can be what type of recipient the user is for the electronic communication 210. E.g., an email may include a TO field and a CC field and the user is determined to be a primary recipient of the electronic communication 210 in response to being included in TO field and a secondary recipient of the electronic communication in response to being included in the CC field. By way of another example, the association of content in the electronic communication 210 to a user can be which one or more portions of the content are directed to the user. E.g., the electronic communication 210 may include several sentences with the user tagged in only two of those sentences, so those two sentences would be the portion of the content directed to the user.

The content association identification module 212 can determine the association of the content in the electronic communication 210 to the user in any of a variety of different manners. In one or more implementations, the association is determined based on whether the user is a primary recipient or a secondary recipient of the electronic communication 210 (e.g., based on TO and CC fields as discussed above). Additional levels of recipients may also be included in the electronic communication 210, such as a tertiary recipient, a quaternary recipient, and so forth.

Additionally or alternatively, the association of the content in the electronic communication 210 to the user is determined based on portions of the content that tag the user and identify the portion of the content directed to the user. Tags can be specified in various manners, such as prefacing the name or identifier of the user with a particular symbol (e.g., "@") or underlining the name or identifier of the user. The portion of the content direction to the user can begin immediately after the tag and end with various stop conditions, such as occurrence of a tag directed to another user, occurrence of a particular punctuation mark (e.g., period or carriage return), and so forth.

Additionally or alternatively, the association of the content in the electronic communication 210 to the user is determined based on gender information included in the content or the context 218. For example, if electronic communication 210 including content of "Happy Birthday, son!" is sent to two users named Bob and Alice, and they are both in the same TO field, then the content association identification module 212 can determine the gender of the two users based on their names and further determine that the primary recipient is Bob and the secondary recipient is Alice. By way of another example, the context 218 can identify the genders of the various recipients of the electronic communication 210.

Additionally or alternatively, the association of the content in the electronic communication 210 to the user is determined based on the context 218, such as recipients' birthdays, work anniversaries, wedding anniversaries, and so forth. For example, if electronic communication 210 including content of "Happy Birthday, son!" is sent to two users named Bob and Dave, and they are both in the same TO field, then the content association identification module 212 can determine that the one of the two users whose birthday is the current day is the primary recipient and the other is the secondary recipient.

Additionally or alternatively, the association of the content in the electronic communication 210 to the user is determined based on a history of communication for the same group of recipients. For example, the electronic communication 210 may be the most recent email in an email thread that includes several recipients but the two immediately preceding emails in the thread were a conversation between only two people in the group discussing some issue. If the most recent email includes a discussion of the same subject matter as in the two immediately preceding emails, then the content association identification module 212 can determine that those two users are the primary recipients and the other users in the group are secondary recipients.

Additionally or alternatively, situations may arise in which the content association identification module 212 cannot determine the association of the content in the electronic communication 210 to the user. In such situations various actions can be taken, such as determining a default association. E.g., the default association can be that the user is a secondary recipient.

The content association identification module 212 outputs the association of the content in the electronic communication 210 to the user as content-user association 220. In one or more embodiments the targeted natural language response system 204 generates a natural language response targeted to the user of the system 200 so the content-user association 220 need only include the association of the content to the user of the system 200. Additionally or alternatively, the content association identification module 212 can generate and output the association of additional (e.g., all) the recipients of the electronic communication 210.

The response generation module 216 receives the content-user association 220 and the electronic communication 210 and generates a set of one or more natural language responses 222 to the electronic communication 210. This natural language response set 222 is targeted to the user based on the association of the electronic communication 210 to the user as indicated by the content-user association 220. The response generation module 216 optionally generates the natural language response set 222 based on additional information, such as context 218 related to the user (e.g., the user's birthdate, anniversary date).

The response generation module 216 can generate the target natural language response set 222 using any of a variety of public or proprietary techniques. In one or more embodiments, response generation module 216 is implemented using any one or more of a variety of different public or proprietary machine learning systems. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The machine learning system is trained to identify the target natural language response set 222 based on the content-user association 220 and the content of the electronic communication 210. For example, a machine learning system can be trained (e.g., using supervised or unsupervised learning) to identify, based on the body or subject line of the electronic communication 210 and the content-user association 220, one or more natural language responses for the user based on whether the user is a primary recipient or a secondary recipient of the electronic communication 210. By way of another example, a machine learning system can be trained (e.g., using supervised or unsupervised learning) to identify, based on the body or subject line of the electronic communication 210 and the content-user association 220, one or more natural language responses for the user based on which one or more portions of the content of the electronic communication 210 are directed to the user.

The machine learning system can be trained in any of a variety of different manners depending on the type of machine learning system, such as by updating connection weights or weights of filters in the machine learning system to minimize a loss between generated natural language responses and known natural language responses to electronic communications based on the association of the electronic communications to the user and the content of the electronic communications.

The electronic communication application 206 displays a user interface that includes the electronic communication 210 and the set of targeted natural language responses 222. Various additional user interface elements can be displayed allowing the user to select recipients to the selected natural language responses, such as whether to reply to just the sender of the electronic communication, reply to all recipients of the electronic communication, forward the electronic communication to another user, and so forth.

In response to user selection of one or more of the natural language responses in the set 222, the electronic communication application 206 creates a new electronic communication 224 that includes the selected one or more natural language responses and provides the electronic communication 224 to the communication system 202. The communication system 202 then sends the electronic communication 224 to the devices of the recipients of the electronic communication 224.

Although the targeted natural language response system 204 is discussed herein with reference to generating different natural language responses targeted to particular users, so different natural language responses are automatically generated for different users but the same electronic communication, additional functionality can also be implemented. For example, the targeted natural language response system 204 can generate a response for an electronic communication 210 listing only the user as a recipient. By way of another example, if the electronic communication 210 is directed to all recipients with the same intent (e.g., wishing everyone a Happy New Year), then the targeted natural language response system generates the same natural language responses for all recipients.

Figure 3:
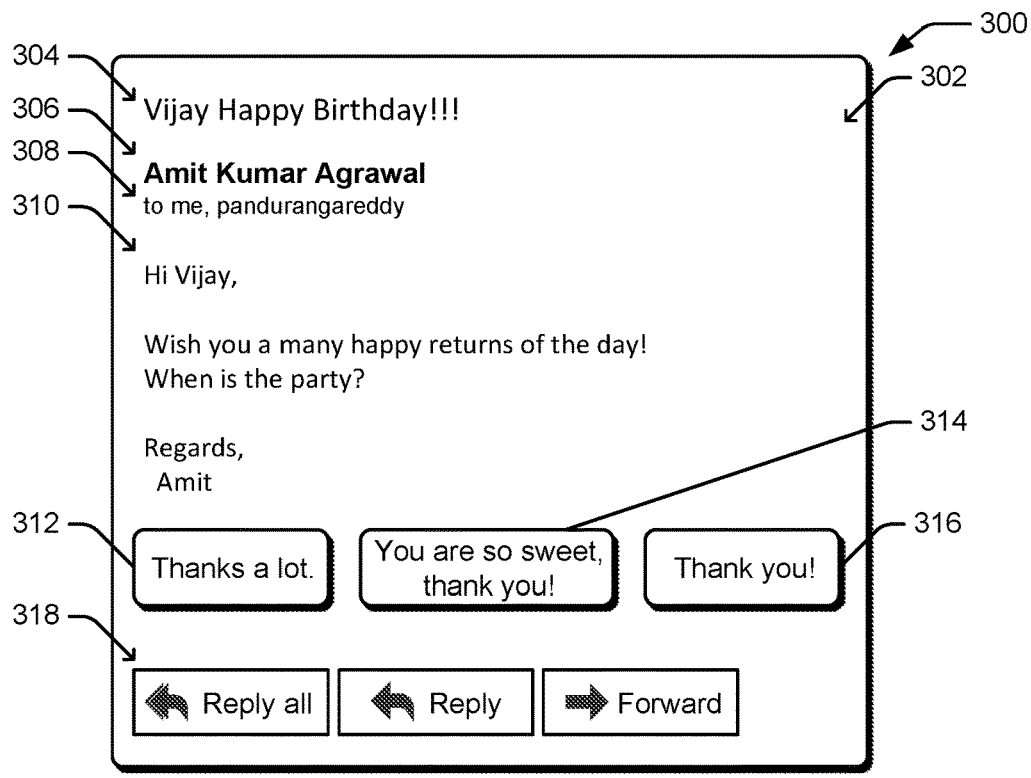
FIGS. 3, 4, and 5 illustrate example user interfaces displaying electronic communications and targeted natural language responses in accordance with one or more embodiments.
Figure 3:
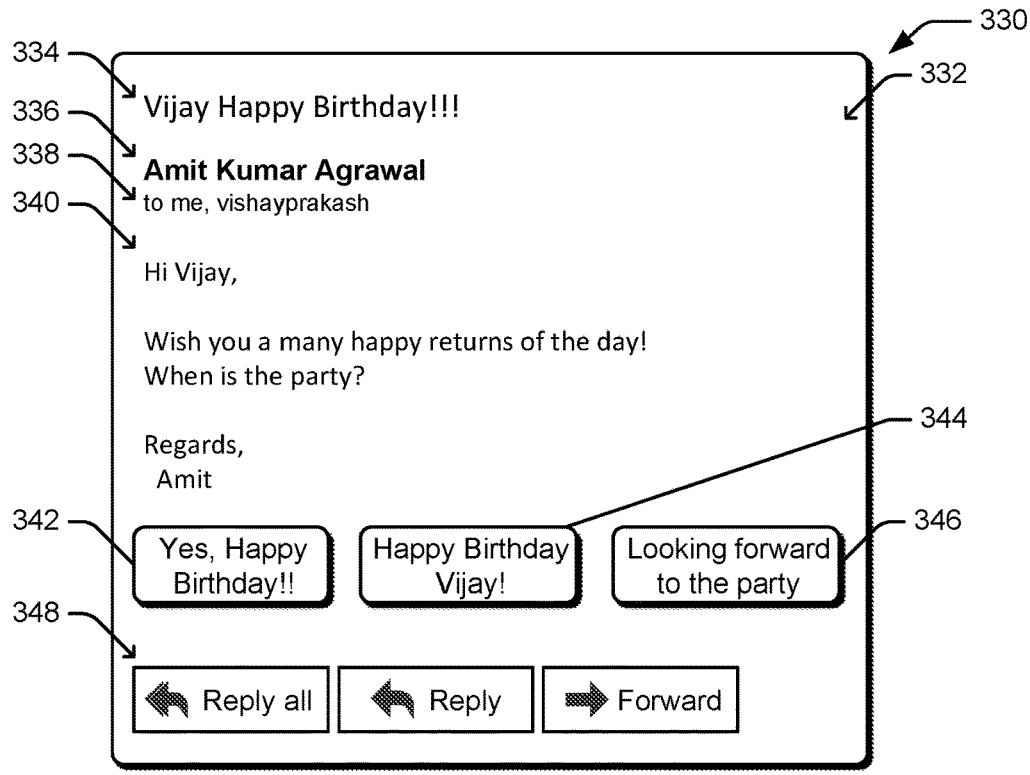
Figure 4:
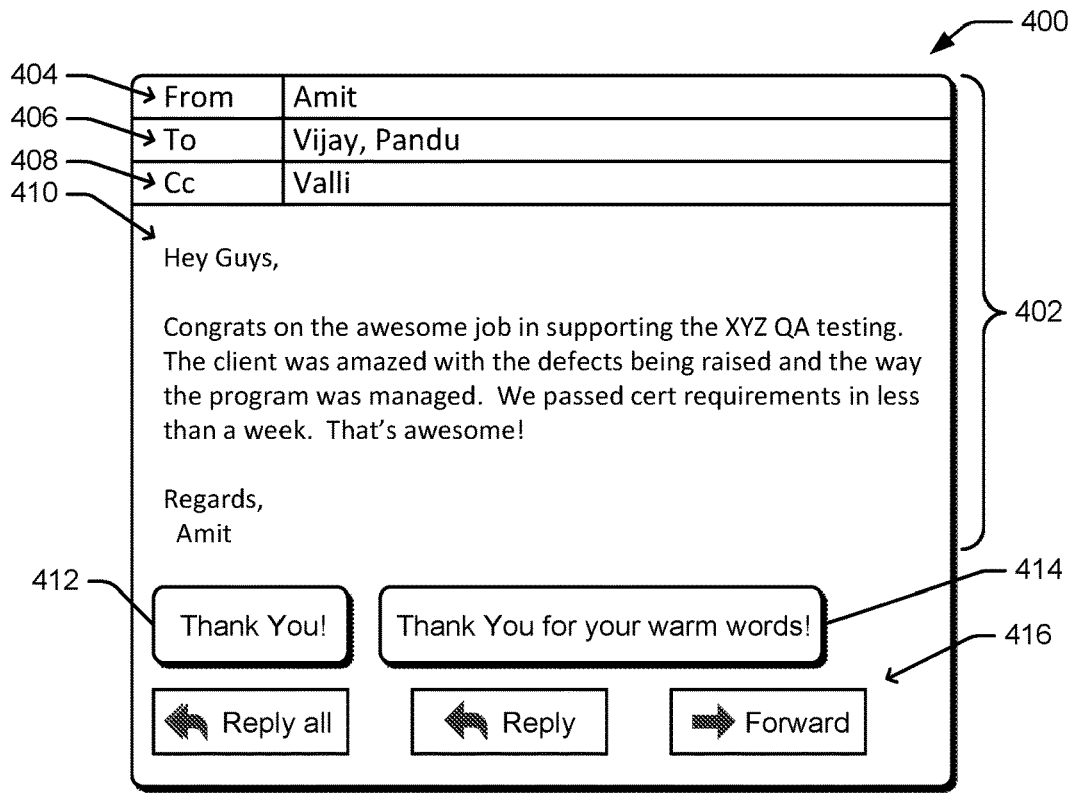
Figure 4:
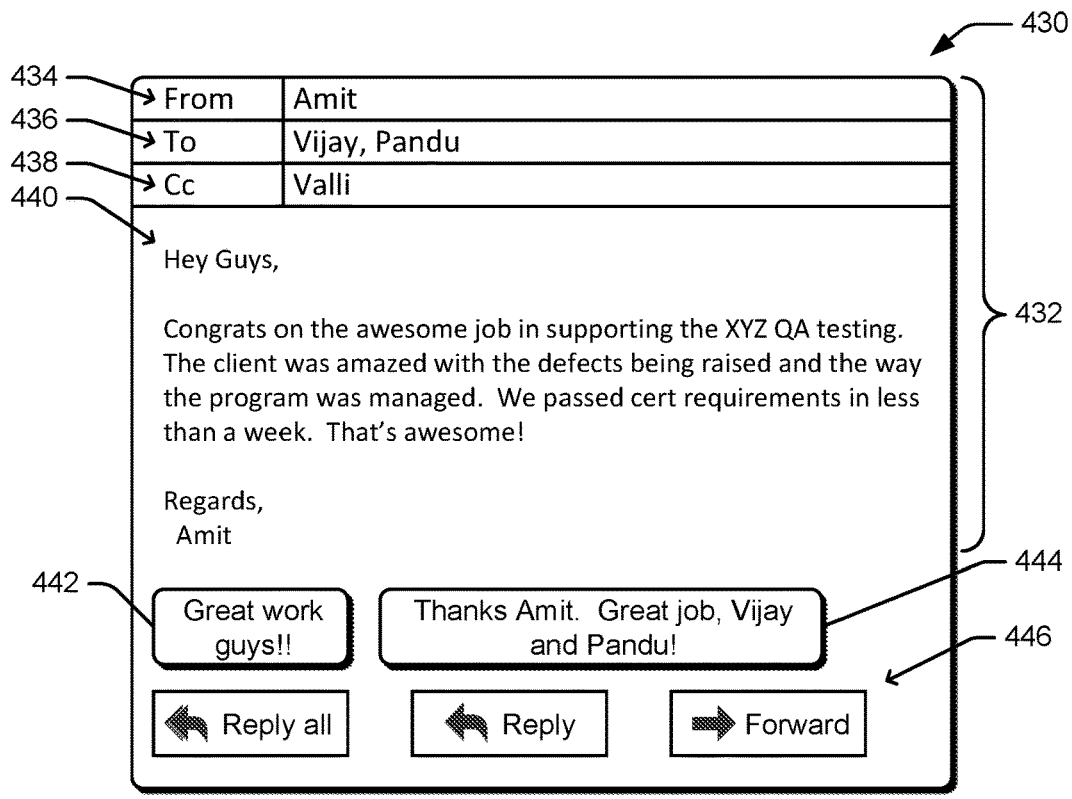
Figure 5:
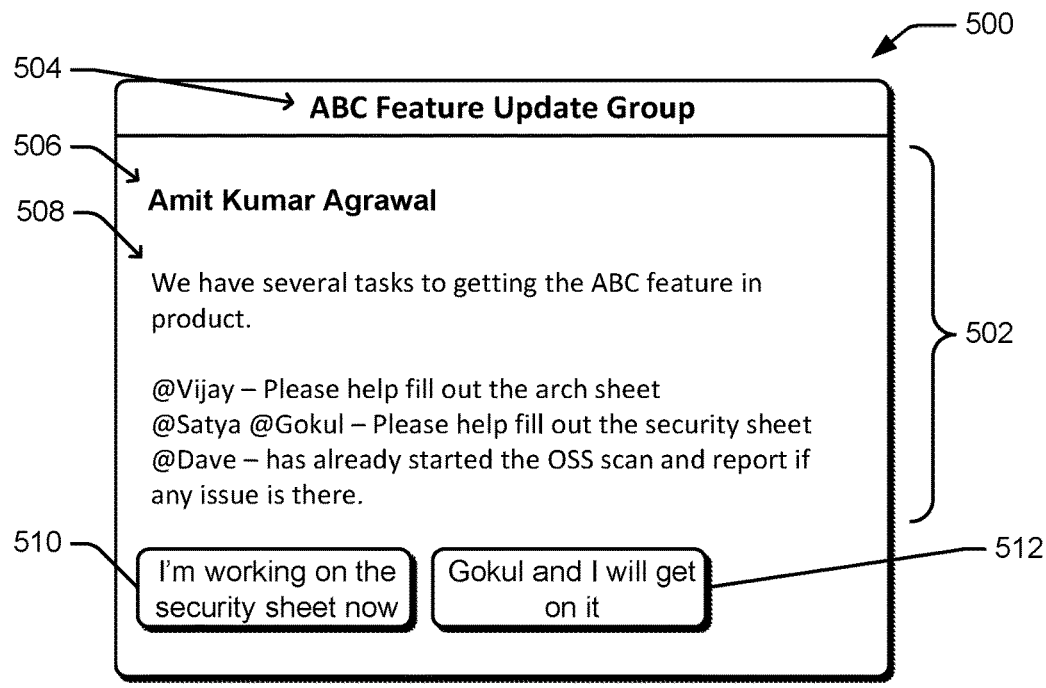
Figure 5:
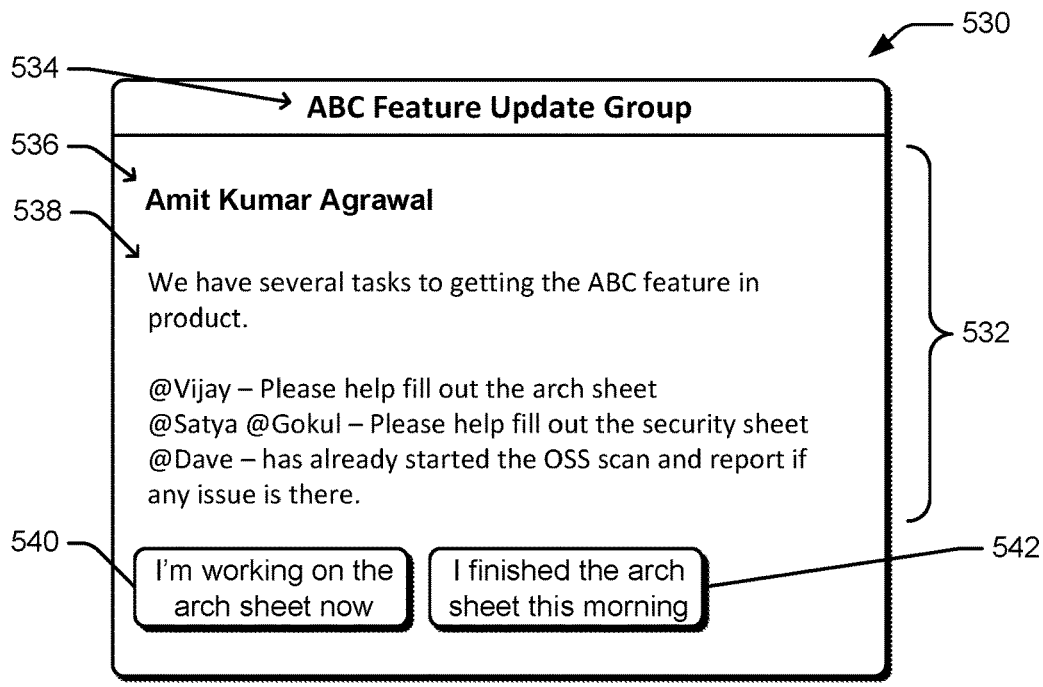

FIGS. 3-5 illustrate example user interfaces displaying electronic communications and targeted natural language responses in accordance with one or more embodiments. FIG. 3 illustrates an example user interface 300 including an electronic communication 302 with a subject line 304, sender 306, recipient list 308, and body 310. As shown, the electronic communication 300 is a Happy Birthday greeting from Amit to Vijay that is also sent to Pandu. The user interface 300 is displayed by Vijay (shown as "me" in the recipient list).

The targeted natural language response system 204 of FIG. 2 generates three targeted natural language responses shown in the user interface 300 as targeted natural language responses 312, 314, and 316. The natural language responses 312, 314, and 316 are targeted to Vijay (e.g., are appropriate for Vijay to respond because it is his birthday) because the targeted natural language response system 204 determined that Vijay is a primary recipient of the Happy Birthday greeting. This determination can have been made, for example, based on the subject line 304 identifying Vijay, the greeting in the body 310 identifying Vijay, a separate database indicating that the date the electronic communication 302 was sent was Vijay's birthday, and so forth. The user can select a desired one of the natural language responses 312, 314, and 316 as well as one of the response routing options 318 (e.g., Reply all, Reply, or Forward) to have a reply electronic communication including the selected natural language response sent to the appropriate recipients.

FIG. 3 also illustrates an example user interface 330 including an electronic communication 332 with a subject line 334, sender 336, recipient list 338, and body 340. As shown, the electronic communication 330 is a Happy Birthday greeting from Amit to Vijay that is also sent to Pandu. Electronic communication 332 is the same as electronic communication 302, although the user interface 330 is displayed by Pandu (shown as "me" in the recipient list) rather than Vijay.

The targeted natural language response system 204 of FIG. 2 generates three targeted natural language responses shown in the user interface 330 as targeted natural language responses 342, 344, and 346. The natural language responses 342, 344, and 346 are targeted to Pandu (e.g., are appropriate for Pandu to respond because it is not his birthday) because the targeted natural language response system 204 determined that Pandu is a secondary recipient of the Happy Birthday greeting. This determination can have been made, for example, based on the subject line 334 identifying Vijay, the greeting in the body 340 identifying Vijay, a separate database indicating that the date the electronic communication 332 was sent was Vijay's birthday, a separate database indicating that the date the electronic communication 332 was sent was not Pandu's birthday, and so forth. The user can select a desired one of the natural language responses 342, 344, and 346 as well as one of the response routing options 348 (e.g., Reply all, Reply, or Forward) to have a reply electronic communication including the selected natural language response sent to the appropriate recipients.

FIG. 4 illustrates an example user interface 400 including an electronic communication 402 with a sender 404, a TO field 406, a CC field 408, and body 410. As shown, the electronic communication 402 is a congratulatory message from Amit to Vijay and Pandu, copying Valli. In this example, the user interface 400 is assumed to be displayed by Vijay, although he same user interface would be displayed to Pandu because Vijay and Pandu are both primary recipients of the electronic communication 402 due to their being listed in the TO field 406.

The targeted natural language response system 204 of FIG. 2 generates two targeted natural language responses shown in the user interface 400 as targeted natural language responses 412 and 414. The natural language responses 412 and 414 are targeted to Vijay (e.g., are appropriate for Vijay to respond because he is being congratulated) because the targeted natural language response system 204 determined that Vijay is a primary recipient of the congratulatory message. This determination can have been made, for example, based on the TO field 406 identifying Vijay. The user can select a desired one of the natural language responses 412 and 414 as well as one of the response routing options 416 (e.g., Reply all, Reply, or Forward) to have a reply electronic communication including the selected natural language response sent to the appropriate recipients.

FIG. 4 also illustrates an example user interface 430 including an electronic communication 432 with a sender 434, a TO field 436, a CC field 438, and body 440. As shown, the electronic communication 432 is a congratulatory message from Amit to Vijay and Pandu, copying Valli. Electronic communication 432 is the same as electronic communication 402, although the user interface 430 is displayed by Villi rather than Vijay or Pandu.

The targeted natural language response system 204 of FIG. 2 generates two targeted natural language responses shown in the user interface 430 as targeted natural language responses 442 and 444. The natural language responses 442 and 444 are targeted to Valli (e.g., are appropriate for Valli to respond because she is not being congratulated) because the targeted natural language response system 204 determined that Vijay is a secondary recipient of the congratulatory message. This determination can have been made, for example, based on the CC field 438 identifying Valli. The user can select a desired one of the natural language responses 442 and 444 as well as one of the response routing options 446 (e.g., Reply all, Reply, or Forward) to have a reply electronic communication including the selected natural language response sent to the appropriate recipients.

FIG. 5 illustrates an example user interface 500 including an electronic communication 502 corresponding to a group named "ABC Feature Update Group". The recipients of the electronic communication 502 are not displayed in the user interface 500 but are known to the electronic communication application displaying the user interface 500. For example, the recipients can include Vijay, Satya, Gokul, and Dave. The user interface 500 displays the group name 504 as well as the electronic communication 502 including a sender 506 and a body 508. As shown, the electronic communication 502 is a message requesting various recipients to perform various tasks. In this example, the user interface 500 is displayed by Satya.

The targeted natural language response system 204 of FIG. 2 generates two targeted natural language responses shown in the user interface 500 as targeted natural language responses 510 and 512. The natural language responses 510 and 512 are targeted to Satya (e.g., are appropriate for Satya to respond) because the targeted natural language response system 204 determined that a portion of the body (@Satya @Gokul—Please help fill out the security sheet) is directed to Satya. This determination can have been made, for example, based on the tag @Satya identifying Satya and the portion of the body 508 until the next line begins). The user can select a desired one of the natural language responses 510 and 512 to have a reply electronic communication including the selected natural language response sent to the other users in the ABC Feature Update Group.

FIG. 5 also illustrates an example user interface 530 including an electronic communication 532 corresponding to a group named "ABC Feature Update Group". As shown, the user interface 530 displays the group name 534 as well as the electronic communication 532 including a sender 536 and a body 538. Electronic communication 532 is the same as electronic communication 502, although the user interface 530 is displayed by Vijay rather than Satya.

The targeted natural language response system 204 of FIG. 2 generates two targeted natural language responses shown in the user interface 530 as targeted natural language responses 540 and 542. The natural language responses 540 and 542 are targeted to Vijay (e.g., are appropriate for Vijay to respond) because the targeted natural language response system 204 determined that a portion of the body (@Vijay—Please help fill out the arch sheet) is directed to Vijay. This determination can have been made, for example, based on the tag @Vijay identifying Vijay and the portion of the body 538 until the next line begins). The user can select a desired one of the natural language responses 540 and 542 to have a reply electronic communication including the selected natural language response sent to the other users in the ABC Feature Update Group.

Thus, as can be seen from the examples in FIGS. 3-5, different natural language responses are generated for different users depending on their association with the electronic communication. These natural language responses target particular users of the electronic communication rather than being generic for all recipients of the electronic communication.

Figure 6:
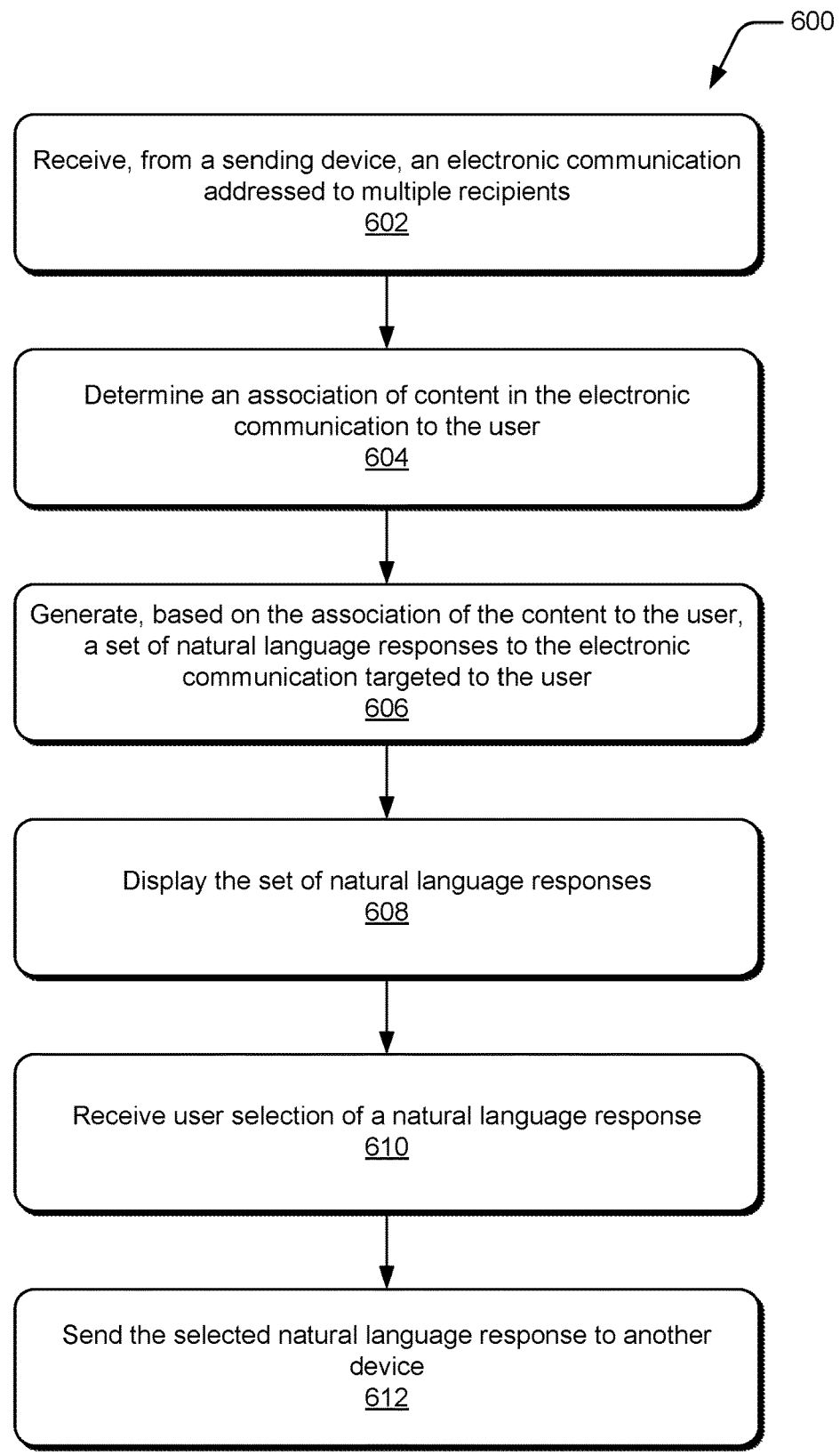
FIG. 6 illustrates an example process for implementing the techniques discussed herein in accordance with one or more embodiments.

FIG. 6 illustrates an example process 600 for implementing the techniques discussed herein in accordance with one or more embodiments. Process 600 is carried out by a communication system, an application, and a targeted natural language response system, or a combination thereof, such as communication system 202, electronic communication application 206, and targeted natural language response system 204 of FIG. 2, and can be implemented in software, firmware, hardware, or combinations thereof. Process 600 is shown as a set of acts and is not limited to the order shown for performing the operations of the various acts.

In process 600, an electronic communication from a sending device is received at a receiving device (act 602). The electronic communication is addressed to multiple recipients including a user of the receiving device.

An association of content in the electronic communication to the user is determined (act 604). Different ones of the multiple recipients have different associations with the content in the electronic communication. The association of content in the electronic communication to the user can be, for example, what type of recipient the user is for the electronic communication (e.g., primary recipient or secondary recipient), which one or more portions of the content are directed to the user, and so forth.

A set of natural language responses to the electronic communication, targeted to the user, is generated based at least in part on the association of the content to the user (act 606). This set of natural language responses can be generated, for example, by a machine learning system trained, based on associations of electronic communications to users and content in the electronic communications, to generate the set of natural language responses.

The set of natural language responses is displayed or otherwise presented by the receiving device (act 608).

User selection of a natural language response from the set of natural language responses is received (act 610) and the selected natural language response is sent to one or more other devices (act 612). The selected natural language response is typically sent to the sending device although can also be sent to other devices including or excluding the sending device.

Figure 7:
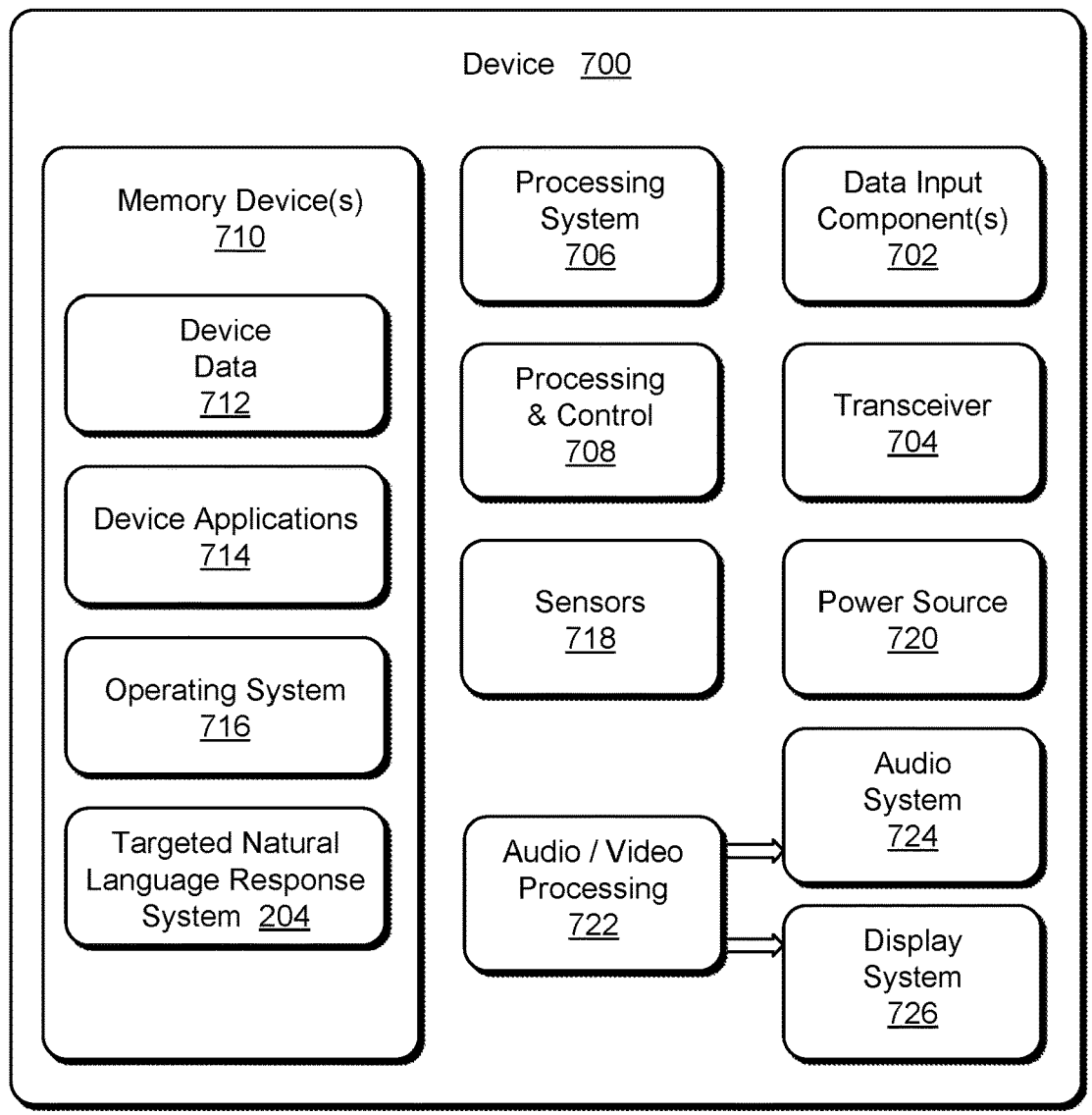
FIG. 7 illustrates various components of an example electronic device that can implement embodiments of the techniques discussed herein.

FIG. 7 illustrates various components of an example electronic device in which embodiments of targeted natural language responses for electronic communications can be implemented. The electronic device 700 can be implemented as any of the devices described with reference to the previous FIGS., such as any type of client device, mobile phone, tablet, computing, communication, entertainment, gaming, media playback, and/or other type of electronic device. In one or more embodiments the electronic device 700 the targeted natural language response system 204, described above.

The electronic device 700 includes one or more data input components 702 via which any type of data, media content, or inputs can be received such as user-selectable inputs, messages, music, television content, recorded video content, and any other type of text, audio, video, or image data received from any content or data source. The data input components 702 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 702 may also include various other input components such as microphones, touch sensors, touchscreens, keyboards, and so forth.

The device 700 includes communication transceivers 704 that enable wired and/or wireless communication of device data with other devices. The device data can include any type of text, audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 700 includes a processing system 706 of one or more processors (e.g., any of microprocessors, controllers, and the like) and/or a processor and memory system implemented as a system-on-chip (SoC) that processes computer-executable instructions. The processing system 706 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 708. The device 700 may further include any type of a system bus or other data and command transfer system that couples the various components within the device. A system bus can include any one or combination of different bus structures and architectures, as well as control and data lines.

The device 700 also includes computer-readable storage memory devices 710 that enable data storage, such as data storage devices that can be accessed by a computing device, and that provide persistent storage of data and executable instructions (e.g., software applications, programs, functions, and the like). Examples of the computer-readable storage memory devices 710 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory device 710 provides data storage mechanisms to store the device data 712, other types of information and/or data, and various device applications 714 (e.g., software applications). For example, an operating system 716 can be maintained as software instructions with a memory device and executed by the processing system 706. The device applications 714 may also include a device manager, such as any form of a control application, software application, signal-processing and control module, code that is native to a particular device, a hardware abstraction layer for a particular device, and so on.

The device 700 can also include one or more device sensors 718, such as any one or more of an ambient light sensor, a proximity sensor, a touch sensor, an infrared (IR) sensor, accelerometer, gyroscope, thermal sensor, audio sensor (e.g., microphone), and the like. The device 700 can also include one or more power sources 720, such as when the device 700 is implemented as a mobile device. The power sources 720 may include a charging and/or power system, and can be implemented as a flexible strip battery, a rechargeable battery, a charged super-capacitor, and/or any other type of active or passive power source.

The device 700 additionally includes an audio and/or video processing system 722 that generates audio data for an audio system 724 and/or generates display data for a display system 726. In accordance with some embodiments, the audio/video processing system 722 is configured to receive call audio data from the transceiver 704 and communicate the call audio data to the audio system 724 for playback at the device 700. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although embodiments of techniques for targeted natural language responses for electronic communications have been described in language specific to features or methods, the subject of the appended claims is not necessarily limited to the specific features or methods described. Rather, the specific features and methods are disclosed as example implementations of techniques for implementing targeted natural language responses for electronic communications. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: receiving, at a receiving device, an electronic communication from a sending device, the electronic communication being addressed to multiple recipients including a user of the receiving device; determining, by the receiving device, an association of content in the electronic communication to the user, different ones of the multiple recipients having different associations with the content in the electronic communication; generating, based at least in part on the association of the content to the user, a set of natural language responses to the electronic communication targeted to the user; displaying, by the receiving device, the set of natural language responses; receiving user selection of a natural language response included in the set of natural language responses; and sending the selected natural language response to the sending device.

Alternatively or in addition to the above described method, any one or combination of the following. The content in the electronic communication includes multiple portions, the determining the association of the content to the user comprising determining a portion of the multiple portions that is directed to the user rather than to another of the multiple recipients, and the generating comprising generating the set of natural language responses based at least in part on content in the portion. The method further comprising identifying the portion as part of the content that includes a tag identifying the user. The determining the association of the content to the user comprising determining whether the user is a primary recipient of the electronic communication or a secondary recipient of the electronic communication, and the generating comprising generating the set of natural language responses based at least in part on whether the first user is the primary recipient or the secondary recipient. The determining whether the user is a primary recipient or a secondary recipient comprising determining that the user is the primary recipient in response to the user being identified in a to field of the electronic communication, and determining that the user is the secondary recipient in response to the user being identified in a copy field of the electronic communication. The determining whether the user is a primary recipient or a secondary recipient comprising determining that the user is the primary recipient based on a birthday or anniversary date of the primary recipient and a birthday or anniversary date of the secondary recipient. The determining whether the user is a primary recipient or a secondary recipient comprising determining that the user is the primary recipient based on genders of the primary recipient and the secondary recipient. The generating the set of natural language responses comprising using a machine learning system trained, based on associations of electronic communications to users and content in the electronic communications, to generate the set of natural language responses.

A computing device comprising: a processor implemented in hardware; and a computer-readable storage medium having stored thereon multiple instructions that, responsive to execution by the processor, cause the processor to perform acts including: receiving, at the computing device, an electronic communication from an additional computing device, the electronic communication being addressed to multiple recipients including a user of the computing device; determining, by the computing device, an association of content in the electronic communication to the user, different ones of the multiple recipients having different associations with the content in the electronic communication; generating, based at least in part on the association of the content to the user, a set of natural language responses to the electronic communication targeted to the user; displaying the set of natural language responses; receiving user selection of a natural language response included in the set of natural language responses; and sending the selected natural language response to the additional computing device.

Alternatively or in addition to the above described computing device, any one or combination of the following. The content in the electronic communication includes multiple portions, the determining the association of the content to the user comprising determining a portion of the multiple portions that is directed to the user rather than to another of the multiple recipients, and the generating comprising generating the set of natural language responses based at least in part on content in the portion. The acts further comprising identifying the portion as part of the content that includes a tag identifying the user. The determining the association of the content to the user comprising determining whether the user is a primary recipient of the electronic communication or a secondary recipient of the electronic communication, and the generating comprising generating the set of natural language responses based at least in part on whether the first user is the primary recipient or the secondary recipient. The determining whether the user is a primary recipient or a secondary recipient comprising determining that the user is the primary recipient in response to the user being identified in a to field of the electronic communication, and determining that the user is the secondary recipient in response to the user being identified in a copy field of the electronic communication. The generating the set of natural language responses comprising using a machine learning system trained, based on associations of electronic communications to users and content in the electronic communications, to generate the set of natural language responses.

A system comprising: a communication system, implemented at least in part in hardware, to receive an electronic communication from a sending device, the electronic communication being addressed to multiple recipients including a user of the system; a content association identification module, implemented at least in part in hardware, to determine an association of content in the electronic communication to the user, different ones of the multiple recipients having different associations with the content in the electronic communication; a response generation module, implemented at least in part in hardware, to generate a set of natural language responses to the electronic communication targeted to the user based at least in part on the association of the content to the user; and the communication system being further to communicate a user selected one of the set of natural language responses to the sending device.

Alternatively or in addition to the above described system, any one or combination of the following. The content in the electronic communication includes multiple portions, the content association identification module being further to determine the association of the content to the user by determining a portion of the multiple portions that is directed to the user rather than to another of the multiple recipients, and the response generation module being further to generate the set of natural language responses based at least in part on content in the portion. The content association identification module being further to identify the portion as part of the content that includes a tag identifying the user. The content association identification module being further to determine the association of the content to the user by determining whether the user is a primary recipient of the electronic communication or a secondary recipient of the electronic communication, and the response generation module being further to generate the set of natural language responses based at least in part on whether the first user is the primary recipient or the secondary recipient. The content association identification module being further to determine whether the user is a primary recipient or a secondary recipient by determining that the user is the primary recipient in response to the user being identified in a to field of the electronic communication, and determining that the user is the secondary recipient in response to the user being identified in a copy field of the electronic communication. The response generation module comprising a machine learning system trained, based on associations of electronic communications to users and content in the electronic communications, to generate the set of natural language responses.

What is claimed is:

1. A method comprising:
receiving, at a receiving device, an electronic communication from a sending device, the electronic communication being addressed to multiple recipients including a user of the receiving device;
determining, by the receiving device, an association of content in the electronic communication to the user, different ones of the multiple recipients having different associations with the content in the electronic communication;
identifying, as a portion of the content directed to the user, a part of the content beginning after a tag identifying the user in a body of the content and ending at a next punctuation mark;
generating, based on the portion of the content directed to the user and the association of the content to the user, a set of natural language responses to the electronic communication targeted to the user, the set of natural language responses varying for different associations the user can have with the content;
displaying, by the receiving device, the set of natural language responses;
receiving user selection of a natural language response included in the set of natural language responses; and
sending the selected natural language response to the sending device.

2. The method as recited in claim 1, wherein the content in the electronic communication includes multiple portions, the determining the association of the content to the user comprising determining a portion of the multiple portions that is directed to the user rather than to another of the multiple recipients, and the generating comprising generating the set of natural language responses based at least in part on content in the portion.

3. The method as recited in claim 1, the determining the association of the content to the user comprising determining whether the user is a primary recipient of the electronic communication or a secondary recipient of the electronic communication, and the generating comprising generating the set of natural language responses based at least in part on whether the user is the primary recipient or the secondary recipient.

4. The method as recited in claim 3, the determining whether the user is a primary recipient or a secondary recipient comprising determining that the user is the primary recipient in response to the user being identified in a to field of the electronic communication, and determining that the user is the secondary recipient in response to the user being identified in a copy field of the electronic communication.

5. The method as recited in claim 3, the determining whether the user is a primary recipient or a secondary recipient comprising determining that the user is the primary recipient based on a birthday or anniversary date of the primary recipient and a birthday or anniversary date of the secondary recipient.

6. The method as recited in claim 3, the determining whether the user is a primary recipient or a secondary recipient comprising determining that the user is the primary recipient based on genders of the primary recipient and the secondary recipient.

7. The method as recited in claim 1, the generating the set of natural language responses comprising using a machine learning system trained, based on associations of electronic communications to users and content in the electronic communications, to generate the set of natural language responses.

8. A computing device comprising:
a processor implemented in hardware; and
a computer-readable storage medium having stored thereon multiple instructions that, responsive to execution by the processor, cause the processor to perform acts including:
receiving, at the computing device, an electronic communication from an additional computing device, the electronic communication being addressed to multiple recipients including a user of the computing device;

determining, by the computing device, an association of content in the electronic communication to the user, different ones of the multiple recipients having different associations with the content in the electronic communication;

identifying, as a portion of the content directed to the user, a part of the content beginning after a tag identifying the user in a body of the content and ending at a tag identifying another user;

generating, based on the portion of the content directed to the user and the association of the content to the user, a set of natural language responses to the electronic communication targeted to the user, the set of natural language responses varying for different associations the user can have with the content;

displaying the set of natural language responses;

receiving user selection of a natural language response included in the set of natural language responses; and sending the selected natural language response to the additional computing device.

9. The computing device as recited in claim 8, wherein the content in the electronic communication includes multiple portions, the determining the association of the content to the user comprising determining a portion of the multiple portions that is directed to the user rather than to another of the multiple recipients, and the generating comprising generating the set of natural language responses based at least in part on content in the portion.

10. The computing device as recited in claim 8, the determining the association of the content to the user comprising determining whether the user is a primary recipient of the electronic communication or a secondary recipient of the electronic communication, and the generating comprising generating the set of natural language responses based at least in part on whether the user is the primary recipient or the secondary recipient.

11. The computing device as recited in claim 8, the generating the set of natural language responses comprising using a machine learning system trained, based on associations of electronic communications to users and content in the electronic communications, to generate the set of natural language responses.

12. A system comprising:
a communication system, implemented at least in part in hardware, to receive an electronic communication from a sending device, the electronic communication being addressed to multiple recipients including a user of the system;

a content association identification module, implemented at least in part in hardware, to determine an association of content in the electronic communication to the user, different ones of the multiple recipients having different associations with the content in the electronic communication, and identify, as a portion of the content directed to the user, a part of the content beginning after a tag identifying the user in a body of the content and ending at a next punctuation mark;

a response generation module, implemented at least in part in hardware, to generate a set of natural language responses to the electronic communication targeted to the user based on the portion of the content directed to the user and the association of the content to the user, the set of natural language responses varying for different associations the user can have with the content; and the communication system being further to communicate a user selected one of the set of natural language responses to the sending device.

13. The system as recited in claim 12, wherein the content in the electronic communication includes multiple portions, the content association identification module being further to determine the association of the content to the user by determining a portion of the multiple portions that is directed to the user rather than to another of the multiple recipients, and the response generation module being further to generate the set of natural language responses based at least in part on content in the portion.

14. The system as recited in claim 12, the content association identification module being further to determine the association of the content to the user by determining whether the user is a primary recipient of the electronic communication or a secondary recipient of the electronic communication, and the response generation module being further to generate the set of natural language responses based at least in part on whether a first user is the primary recipient or the secondary recipient.

15. The system as recited in claim 14, the content association identification module being further to determine whether the user is a primary recipient or a secondary recipient by determining that the user is the primary recipient in response to the user being identified in a to field of the electronic communication, and determining that the user is the secondary recipient in response to the user being identified in a copy field of the electronic communication.

16. The method as recited in claim 1, each of the natural language responses comprising a response to the content in the electronic communication.

17. The method as recited in claim 1, wherein the generating includes generating the set of natural language responses based on the portion of the content directed to the user rather than other portions of the content that are not the portion of the content directed to the user.

18. The method as recited in claim 3, wherein the determining whether the user is a primary recipient or a secondary recipient comprising determining that the user is the primary recipient based on a subject line of the electronic communication identifying the user.

19. The method as recited in claim 3, wherein the determining whether the user is a primary recipient or a secondary recipient comprising determining that the user is the primary recipient based on a greeting in the body of the content identifying the user.

20. The computing device as recited in claim 8, wherein the generating includes generating the set of natural language responses based on the portion of the content directed to the user rather than other portions of the content that are not the portion of the content directed to the user.

* * * * *